Figure 1:
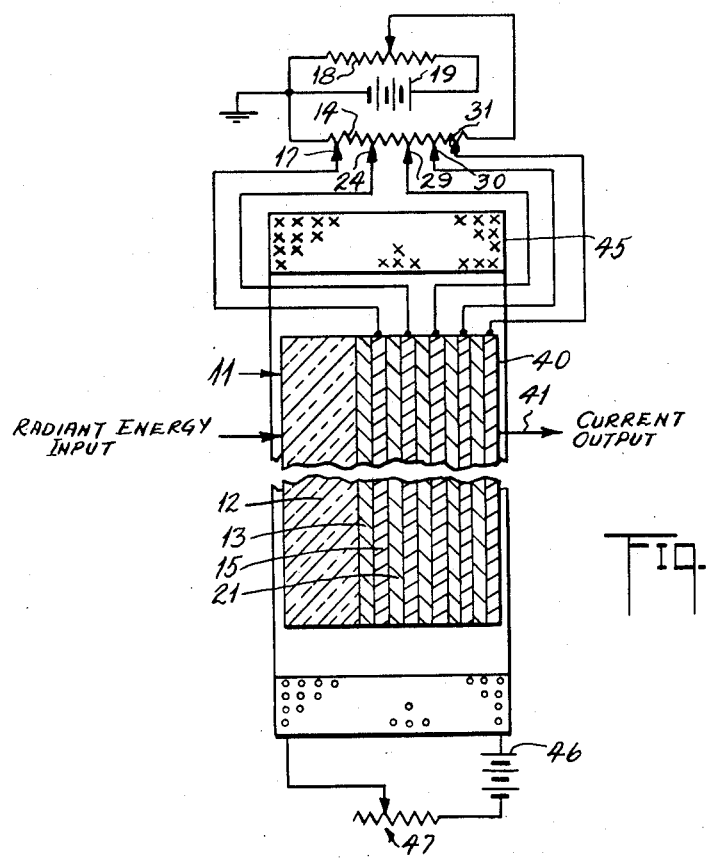

April 21, 1959 R. J. WOHL 2,883,543
RADIATION-TO-CURRENT TRANSDUCER-AMPLIFIER AND RECORDER
Filed Sept. 20, 1954 3 Sheets-Sheet 1

INVENTOR.
ROBERT J. WOHL
BY George Sipkin
Lee J. Huntzberger
ATTORNEYS

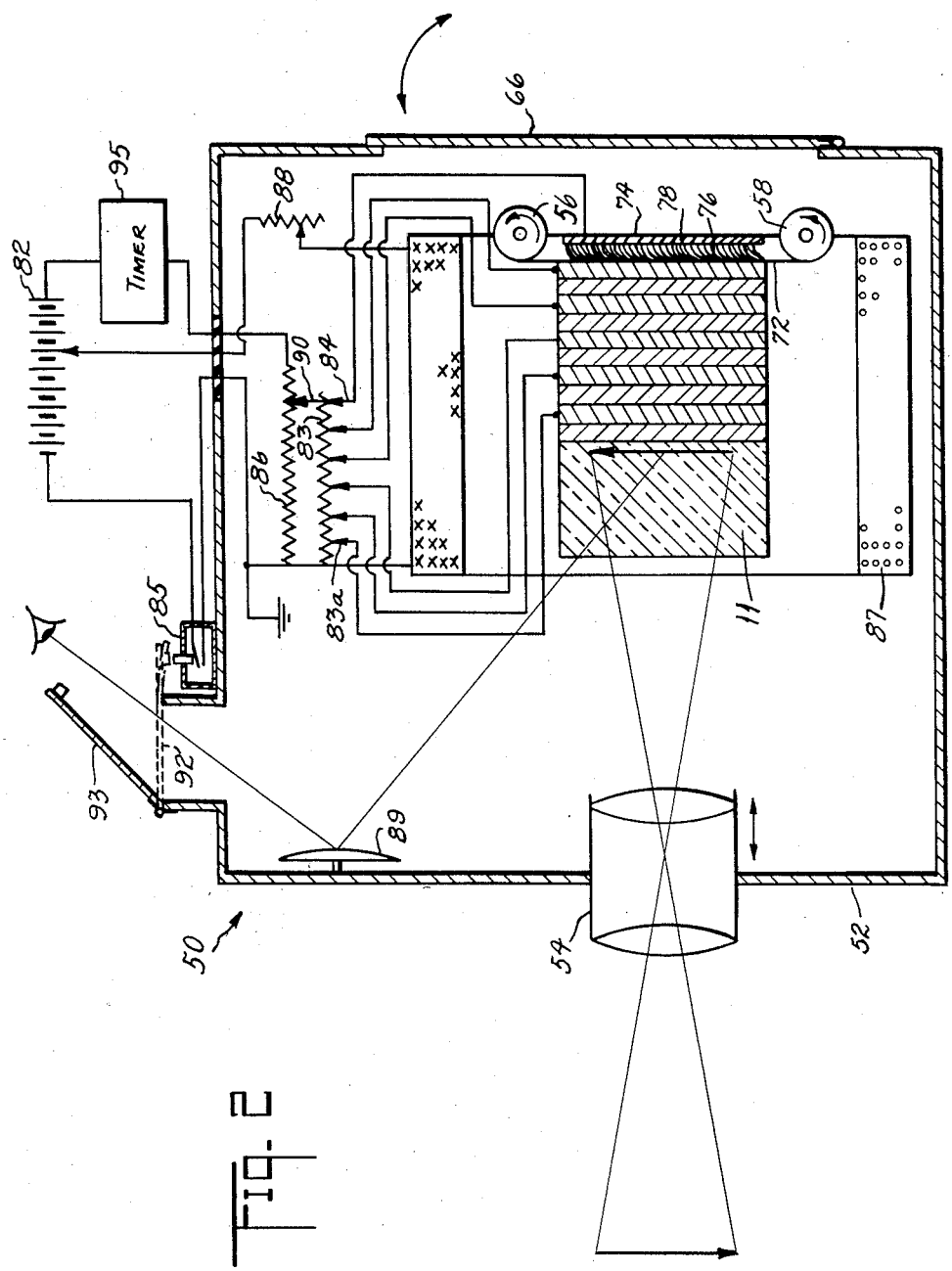

2,883,543

RADIATION-TO-CURRENT TRANSDUCER-AMPLIFIER AND RECORDER

Robert J. Wohl, New York, N.Y.

Application September 20, 1954, Serial No. 457,317

26 Claims. (Cl. 250—49.5)

(Granted under Title 35, U.S. Code (1952), sec. 266)

The invention described herein may be manufactured and used by or for the Government of the United States of America for govermental purposes without the payment of any royalties thereon or therefor.

This invention relates to a radiation-to-current transducer-amplifier and recorder and more particularly, to a radiation-to-current transducer-amplifier and recorder which amplifies and/or processes radiant energy in or about the visible frequency range into an instantaneous recorded image of the immediate source of the radiant energy.

Basically, this invention is directed to the combination of elements of an electronic light amplifier of the type disclosed in U.S. Patent 2,594,740, with recorder elements. The recorder elements of the combination include basically a light-tight box, a radiant energy focusing lens, and recording paper, the latter providing an instantaneous visible image of the immediate source of the radiant energy. The recorder also includes a timer switch for controlling exposure or a current integrator for controlling exposure automatically, and mechanical feeding means for the recording paper.

In the above-referred to patent there is disclosed a transducer which converts radiant energy in the visible frequency range into rays of electrons which are density-distribution-wise essentially extensions of the rays of radiant energy; it amplifies the rays of electrons by means of a linear amplifier arrangement which multiplies uniformly the number of electrons in the electron rays, and then converts the amplified rays of electrons into light rays which duplicate intensity-distribution-wise the image of the immediate source of the radiant energy but at an increased intensity level.

This invention includes a radiant energy-to-current transducer-amplifier. The transducer employed in this invention is distinguishable from that disclosed in the aforementioned patent in that it does not include any means for converting the amplified electron rays into light rays at its output side. Instead, the amplifier shown in the patent, minus the electron ray-to-light ray converting element is combined with a final conducting lamina; the transducer is operated with the final conducting lamina at a raised potential relative to the preceding laminae causing the electron rays to impinge, in rectilinear fashion, on a target such as electro-sensitive paper, which is held in good electrical contact with the final conducting lamina. An electrode is provided for applying a raised potential to the electrosensitive paper on its side opposite that bearing against the final conducting lamina of the transducer. This transducer is mounted in a black box having a focusing lens system and recording paper feeding means for moving the electrosensitive paper into recording relationship with the final conducting lamina of the transducer.

Considering the use of this invention as a camera, a departure from a conventional camera is manifested in that this invention does not necessarily require a shutter, since exposure time is controllable by a variable time selector switch or a current integrator, for controlling the application of potentials to the transducer elements. A diaphragm is not necessarily required with a camera according to this invention since its function can be taken up by the variable amplification of the transducer obtained by variation of the applied potentials. Through the use of a camera, according to this invention, a photographic recording of permanent nature is obtained instantaneously, the recording requiring no further processing after it is withdrawn from the camera. This invention is adapted to be embodied in equipment directly related to a camera. For example, this invention is adapted to be embodied as a photocopier, an enlarger, a motion picture camera, a graphic recorder and a facsimile recorder. Furthermore, because this invention produces instantaneous recorded images it is adapted to be embodied in a motion picture camera to be used in a projection television system.

An object of this invention is to provide a radiation-to-current transducer-amplifier and recorder.

A further object is to provide an instantaneous camera.

A further object is to provide an instantaneous camera for processing radiant energy in or about the frequency band of visual light, into a permanent recorded image of the immediate source of the radiant energy, without any need for developing, fixing, printing or other related processing.

A further object is to provide an instantaneous camera affording amplification of incident radiant energy immediately preceding recording.

A further object is to provide a camera for producing an instantaneous visual recording and wherein a second visual recorded image may be superimposed on a first visual recorded image without the necessity for intermediate processing.

A further object is to provide an instantaneous camera with an all-electronic "shutter" and "diaphragm."

A further object is to provide an instantaneous camera for high speed facsimile printing of any signal transmitted by a television or similar system.

A further object is to provide a direct graphic recorder.

A further object is to provide a direct graphic recorder adapted for use under conditions of shock and vibration.

A further object is to provide a direct graphic recorder adapted for use as a motion picture camera.

A further object is to provide an instantaneous motion picture camera.

A further object is to provide an instantaneous motion picture camera adapted to serve as a link in a projection television system.

A further object is to provide an instantaneous photocopier and enlarger.

Figure 3:
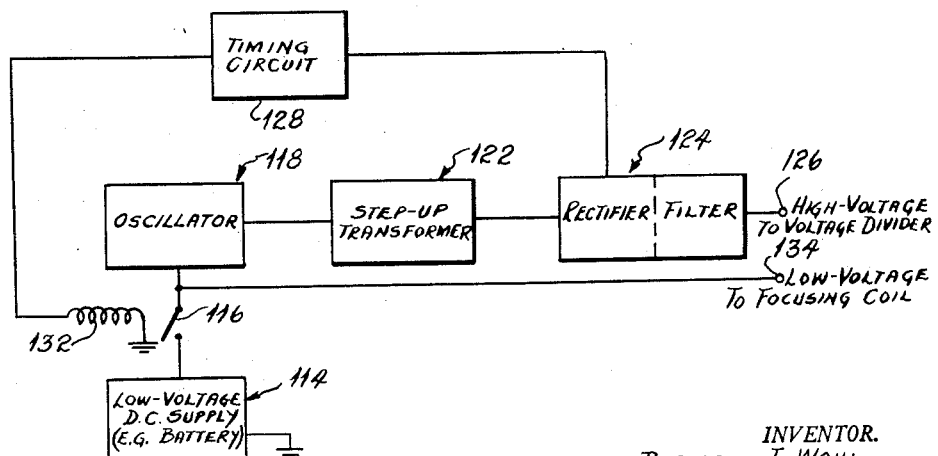
Figure 4:
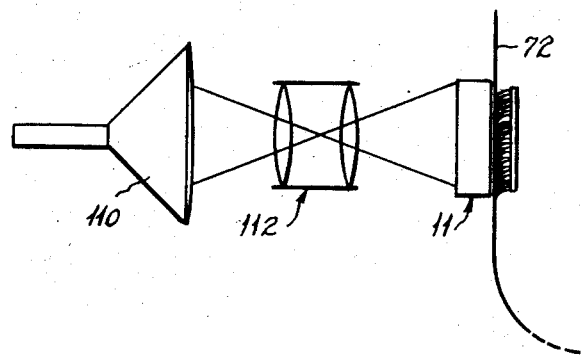
Figure 5:
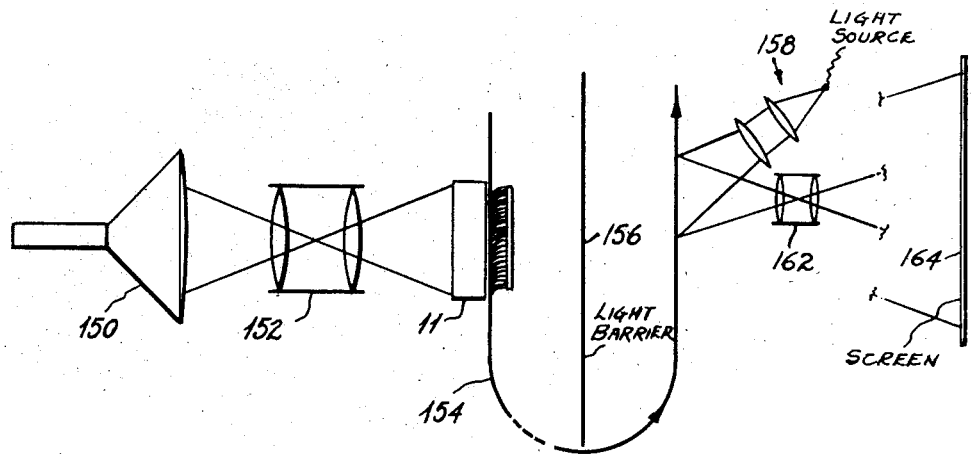

Other objects and many of the attendant advantages of this invention will be readily appreciated as the same becomes better understood by reference to the following detailed description when considered in connection with the accompanying drawings wherein:

Fig. 1 is a schematic diagram showing circuit wiring and mechanical elements of a radiant energy-to-current transducer-amplifier according to a preferred embodiment of this invention, Fig. 2 is a cross-sectional view of an instantaneous camera according to this invention and incorporating the radiant energy-to-current transducer-amplifier of Fig. 1 but with relative physical sizes exaggerated, Fig. 3 is a block diagram of a power supply for use with this invention, Fig. 4 is a schematic diagram of a graphic recorder and a facsimile recorder embodying this invention, and Fig. 5 is a schematic diagram of a projection television system embodying this invention.

The radiant energy-to-current transducer-amplifier includes an amplifying cell 11 (Fig. 1) having a transparent supporting element 12. This transparent supporting element is made of glass, plastic, or other similar suitable material. On the transpaent supporting element 12 there is fixed a series of exceedingly thin laminae, including a photoemissive lamina 13 followed alternately by conductive lamina 15 and secondary emissive lamina 21. The last lamina in the cell is a conductive lamina 40. The materials of the laminae correspond to the materials described in the aforementioned Patent 2,594,740.

A source of direct-current potential such as a battery 19 is connected in circuit with the amplifying cell 11. A potentiometer 18 is connected directly across the battery 19. Its purpose is to vary the potentials applied to the conductive laminae of the transducer-amplifier, so as to change the secondary emission ratio and thus the overall amplification. A second potentiometer, 14, is connected across potentiometer 18 and is provided with a plurality of taps 17, 24, 29, 30 and 31. Potentiometer 14 is a tapped voltage divider for providing a graduated voltage output. The successive alternate conductive laminae of cell 11 are raised to successively higher potentials by means of their connection to the voltage divider 14.

Under certain circumstances it is necessary to connect the lowest potential tap of the voltage divider 14 to a conductive surface (not shown) preceding the photoemissive lamina 13. This conductive surface is transparent to the radiant energy employed. Materials useful for visible light are NESA coating on glass, and conductive glass, which latter is adapted to additionally serve as the transparent supporting element 12.

A focus coil 45 surrounds the cell 11 and serves to prevent spreading of the rays of electrons during movement through successive laminae. Focus coil 45 is energized from a direct-current source such as a battery 46. The battery 46 is connected in series with a focus current adjusting rheostat 47. A permanent magnet is an equivalent or substitute for the focus coil and its power supply. By making the transducer cell 11 sufficiently thin, it becomes unnecessary to provide magnetic focusing means. With radiant energy incident upon the cell 11 as shown in Fig. 1, the photoemissive lamina 13 is excited and emits electrons to an extent proportional to the intensity of the radiation incident at each portion of its surface. The emitted electrons are attracted by the succeeding conducting lamina 15; the latter is at a raised potential relative to the photoemissive lamina 13, causing rectilinear movement of the emitted electrons to the succeeding secondary emissive lamina 21. Succeeding pairs of conducting and secondary emissive lamina increase this amplification. At the output end of cell 11, namely at conductive lamina 40, an electron ray is emitted which is density-distribution-wise an extension of the rays of incident radiant energy.

The radiant energy-to-current transducer-amplifier is combined with other elements in accordance with this invention to form a recorder such as a camera 50, shown in Fig. 2. The camera 50 includes a light-tight box 52, a focusing lens 54, and supply and takeup reels 56 and 58. The box 52 has a closure 66 for affording access to the takeup reels. A transducer-amplifier 11 as shown in Fig. 1 is mounted within the light-tight box in axial alignment with the focus lens 54 by means of any suitable support, not shown. Electro-sensitive paper 72 is supported by the reels 56 and 58 for bearing against the current output surface of the transducer-amplifier 11.

A pressure plate is necessary for providing uniformly distributed contact pressure between the electrosensitive paper 72 and the pressure plate and between the current output side of the transducer 11 and the electrosensitive paper 72. A metal brush 74 serving this purpose is mounted in box 52 by conventional supporting means, not shown. The brush 74 includes a multiplicity of discrete, evenly and closely spaced, resilient contact-making wires 76 fixed in a supporting base 78. All of the discrete brush wires 76 mounted in the brush base 78 are at the same potential, being connected to a conducting element in the base 78.

The pressure plate referred to above may also take the form of a rubber-like inflated balloon for pressing a thin conducting lamina against the electrosensitive paper 72 and for pressing the latter against the output end of the transducer 11 in the manner described above.

A direct current source 82 and a voltage divider 86 are connected in circuit with a switch 85 and timer 95. Variable tap 90 on voltage divider 86 controls the current amplification of transducer 11 and serves as the electronic diaphragm of the camera. Across the divider 86 is a second voltage divider 83, which includes a series of voltage taps 83a. The successive taps provide a successively higher range of potentials. A focus coil 87 for the cell 11 is connected in series with rheostat 88 and a portion of the battery 82.

Although the direct current source 82 for the voltage divider 86 is shown external to the camera 52, it is within the scope of this invention to include a direct current source 82 inside the box 52. Voltage taps 83a are connected to the laminae of the cell 11. These taps may be preset by the manufacturer. Adjustable tap 84 is connected to the brush 74. The brush 74 is at a raised potential with respect to the highest potential applied to the laminae of cell 11.

A rapid-action adjustable timer switch 95 is included in series between direct current source 82 and the voltage divider 83. Part of the direct current source 82 is connected in circuit with switch 85, focus coil 87, and rheostat 88. Current for the focus coil 87 may be provided from a separate direct current source.

Hinged plate 93 opens to allow visual sighting through opening 92 in the box 52. The image focused on transducer 11 by lens 54 may be seen through opening 92 by reflection from convex mirror 89. Switch 85, in effect, serves as an interlock in that it ensures that the power supply 82 is open-circuited when hinged plate 93 is open. The switch 85 is adapted to be actuated by pressing closure 93 after it is in closed position.

The camera 50 produces an instantaneous visible recording which requires no processing such as developing, fixing, printing, or the like. The image recording is available for either immediate use or for use as a record. There is no inconvenience in handling the image recording because electrosensitive paper is not affected by heat or light.

A power supply operable from a lower voltage battery for use with the camera of this invention is shown in Fig. 3. This power supply includes a low voltage direct current power supply 114 adapted to be connected through a switch 116 to an oscillator 118. A step-up transformer 122 is connected to the output end of the oscillator 118. The output of the step-up transformer 122 is converted into unidirectional current by a rectifier-filter 124; the rectifier-filter 124 is provided with a high voltage output terminal 126. A timing circuit 128 is connected to the output side of the rectifier portion of rectifier-filter 124. The timing circuit is conventional; it counts rectified pulses and is triggered by a predetermined number of pulses. A relay coil 132 is connected in circuit with the timing circuit 128 and is energized when the timing circuit is triggered. A low voltage terminal 134 connected to the switched side of the low voltage supply 114 is provided for the focus coil. In use, the circuit is first conditioned by adjusting the timing circuit 128 so that it is set for a predetermined exposure time in terms of a predetermined number of half cycles from the rectifier of rectifier-filter 124. Subsequently, the switch 116 is closed. Automatically the timing circuit 128 commences to count the predetermined number of half-cycles. As soon as the predetermined number of half-cycles is counted, the timing circuit 128 permits energization of the relay coil 132 for opening the switch contact 116. For automatic control of exposure time, not requiring a presetting of the exposure time interval, the circuit of Fig. 3 is modified by disconnecting the timing circuit 128 from the rectifier of rectifier-filter 124 and converting it into a current integrating device by substitution of components well known for this purpose. The integrating circuit is connected in series with the brush plate 78 and lead 84 (Fig. 2) whereby it acts to permit energization of relay coil 132 automatically upon proper exposure. Proper exposure time is realized when a predetemined total quantity of charge flows into the integrating circuit.

Because the camera 50 utilizes electrosensitive paper as a recording medium, it is possible after inspecting the exposed paper to superimpose a second image over the first for comparison. To do this the exposed electrosensitive recording paper is simply reinserted into and aligned in the camera 50 and a second image is superimposed on the first image by exposing the paper again in the same way. For example, a cathode ray tube trace may be recorded through the use of camera 50 on a sheet of electrosensitive paper; the paper is removed from the camera for inspection and then reinserted into the camera for superimposing a second image of a cathode ray tube. The second trace might be a calibrating signal. Conventional position indicator means (not shown) connected with the feed rollers 56 and 58 in combination with notches or sprocket holes in the paper facilitate superposition of recorded images.

Where conventional electrosensitive paper of the type used in facsimile recording is used as the recording medium in the camera 50, the recorded images obtainable are negatives. However, if an electrosensitive paper which is black and bleaches in the presence of electric current is made available, a direct positive recording is obtainable through the use of the camera 50. The camera 50 is simple as compared to existing equipment. It yields faster results than conventional camera equipment and because it records the images on the electrosensitive paper, a permanent image recording is obtained with no further processing, which image is not affected by excessive heat.

The camera 50 combined with a drive means is adapted for use as a direct graphic recorder (Fig. 4). To illustrate, assume a varying signal is applied to only one axis of a cathode ray tube 110, and the tube screen image is focused on the input side of the cell 11. The electrosensitive paper 72 is moved by its drive means (not shown) in a direction at right angles to the deflection axis of the varying signal on the face of the cathode ray tube thus providing a time axis. An oscillographic presentation is recorded on the electrosensitive paper. Since the recording element is the cathode ray tube beam and the beam is inertialess, this type of direct graphic recorder is particularly useful in places where there is present shock and vibration. Furthermore, since the recording element is inertialess, it does not limit the frequency response of the system; the frequency response of the system is limited only by the sensitivity of the paper and by the amplification of the transducer-amplifier. With the arrangement of Fig. 4 any pattern appearing on the cathode ray tube face can be recorded on the electrosensitive paper 72 if the electrosensitive paper 72 is stationary and the time base is provided by the cathode ray oscilloscope 110. The camera 50 thus is adapted to function as an instantaneous facsimile recorder.

The camera 52 is adapted to be modified in accordance with well-known photographic principles to provide photocopying equipment or enlarging equipment. Photocopying equipment embodying this invention is suitable for multiplication of office records and small-run reproduction requirements of all kinds. It is also adapted for use in making half tones. Generally, the modification to provide enlarging equipment involves the use of a cell 11 which is considerably larger than is necessary for a portable camera and also the use of wide range adjusting means for supporting the lenses to provide for the wide range of focusing adjustment.

An instantaneous motion picture camera (not shown) constructed in accordance with this invention is related to conventional motion picture cameras as the still camera 50 is related to conventional still cameras. The instantaneous motion picture camera employs mechanism similar to that for operating a shutter in a conventional motion picture camera for operating the exposure switch corresponding to switch 85 of camera 50. This provides the shutter action in the instantaneous motion picture camera. The mechanism for operating the exposure switch is synchronized with the Geneva movement feeding the electrosensitive paper. Electrosensitive paper available for present use in recorders and facsimile apparatus is opaque. A rapid sequence of frames which is obtainable through the use of the instantaneous motion picture camera on electrosensitive paper of this type is useful where it is desired to have immediate prints showing in a series of steps the position of a body in motion. This is an invaluable aid in adjusting machine parts under operating conditions. A more popular example of its utility is in a close race where it is desirable to have a series of prints showing motion near the finish line immediately after the event. The motion picture reel of exposed electrosensitive paper is opaque and can be projected as a motion picture through the use of an opaque projection system similar to the commercial type designated as Balopticon produced by Bausch and Lomb.

An instantaneous motion picture camera according to this invention is adapted to serve as an excellent link in projection television systems, as shown in Fig. 5. The dynamic image on the conventional television picture tube 150 is projected by means of the optical system 152 onto the input side of the transducer-amplifier 11. The electrosensitive paper 154 feeds through the recorder unit as described above in connection with the use of this invention as a motion picture camera. In order to make this a continuous process, the electrosensitive paper 154 is then carried past the light barrier 156 into the projection unit. The projection unit is composed of a light source 158 which focuses a bright light onto the surface of the electrosensitive paper 154. The optical system 162 focuses the image on the electrosensitive paper onto the screen 164. Thus, the projection unit comprises a conventional opaque projector. The function of the light barrier 156 is to prevent light from the projection unit from interfering with the operation of the recording unit. The function of the light barrier can be provided by a light-tight box surrounding the recording unit. No intermediate processing steps are required for the electrosensitive paper 154 between its passage through the recording unit and the point where the recorded image is projected by the projection unit. Time delay between recording and projecting is on the order of seconds. These two factors constitute the essential advantages over present day conventional projection television systems of this type.

The cell 11 of the camera 50 is adapted to be sensitive to one of several frequency ranges in accordance with information presently available in the photoemissive art. Through the use of the same recording paper but by changing the cell 11, the frequency response of the camera can be confined, for example, to the frequency range of infrared light or other limited frequency ranges which at present requires special film. To accomplish this, it would be necessary merely to choose the material of the first or photoemissive lamina, so that it is sensitive in the frequency band of interest. For example, various materials with their low-frequency limits are described in "Photoelectric Phenomena" by A. L. Hughes and L. A. Du Bridge (McGraw-Hill, N.Y., 1932). To extend the operation most efficiently for radiography and roentgenography, a lamina, not shown, which would fluoresce, or give off visible light when excited by the extremely short-wave radiation, is combined with the components of cell 11 by being affixed to cell 11 preceding the photoemissive lamina 13.

In operation, the camera 50 is prepared for use when electrosensitive paper 72 on a supply reel 56 is loaded in the camera 50. There is no need for any special precautions against exposing the electrosensitive paper 72 to light. During the process of loading, the switch 85 in series with the direct-current source 82 is open disconnecting the source 82. The free end of the electrosensitive paper is threaded between the last lamina of cell 11 and brush 74 as shown in Fig. 2 and is attached to the take-up reel 58. The brush 74 assures uniform contact pressure between the electrosensitive paper and the output side of the cell 11 and in addition, transfers the necessary potential from source 82 for recording on the electrosensitive paper. The lens 54 is adjusted so that the image is focused on the cell 11. This is done by viewing the image focused on cell 11 and reflected from convex mirror 89 through opening 92. Closure 93 is then moved to close opening 92 thereby shutting out all light from light-type box 52. Switch 85 is then ready to be actuated by further pressure on member 93. Switch 95 is constructed in accordance with principles conventional in the art of time switches. It is adjusted for the proper time interval so that the correct exposure is obtained on the electrosensitive paper 72. Electronic timing can be readily achieved by utilizing the recording current through lead 84 to operate an integrating circuit, removing the need for mechanical timers. Because the result, i.e. the recording, is obtainable immediately, the recorded image may be checked for exposure and focus and contrast. Where the exposure is off, the time switch 95 or electronic diaphragm control 90 may be adjusted accordingly. Where the focus is off, the focus lens or the magnetic focusing control 88 may be adjusted accordingly. Where the contrast is off, the variable tap 84 on the voltage divider 83 may be adjusted.

Obviously many modifications and variations of the present invention are possible in the light of the above teachings. It is therefore to be understood that within the scope of the appended claims the invention may be practiced otherwise than as specifically described.

I claim:

1. A method of radiation-to-current transducing, amplifying, and recording comprising the steps of focusing on a planar surface of predetermined dimensions a two-dimensional radiation pattern of more intense and less intense areas, transducing the two-dimensional radiation pattern of more intense and less intense areas into a corresponding array of proportionate parallel electron rays, amplifying uniformly the proportionate parallel electron rays while keeping geometrical relationships constant, disposing a flat electrosensitive recording paper perpendicularly across the path of the amplified electron rays, applying a uniform electric field through the recording paper parallel to the electron rays whereby the radiation pattern is recorded on the recording paper as light and dark areas, and terminating exposure of the recording paper when the total charge of the electron rays that flow through the recording paper reaches a predetermined level.

2. A method of direct photography comprising the steps of focusing on a planar surface of predetermined dimensions a two-dimensional light pattern of light and dark areas, transducing the two-dimensional pattern of light and dark areas into a corresponding array of proportionate parallel electron rays, amplifying uniformly the proportionate parallel electron rays while keeping geometrical relationships constant, disposing a flat electrosensitive recording paper perpendicularly across the path of the amplified electron rays, applying a uniform electric field through the recording paper parallel to the electron rays whereby the light pattern is recorded on the recording paper as light and dark areas, and adjusting the intensity of the electric field to adjust the contrast of the recordings.

3. A radiant energy-to-current transducer-amplifier and recorder comprising a first lamina of photosensitive electronemissive material, a plurality of pairs of laminae stacked in a series with all of the laminae in abutting face to face contact with one another, each said pair of laminae including a conductive lamina and a secondary-emissive lamina, said first lamina of photosensitive electron-emissive material being affixed to the first conductive lamina of said stacked pairs of laminae, a conductive lamina affixed to the last of said secondary-emissive laminae in the series, an electrically conductive final member disposed in face to face alignment with and close to said last-mentioned conductive lamina, a source of direct current potential providing a plurality of graduated output potentials, and means connecting said source to said conductive laminae and to said conductive member with said successive conductive laminae and said conductive member at increasingly higher potentials, toward the last final member and when a sheet having thereon an electrosensitive material is interposed between said conductive member and said last mentioned conductive lamina, and radiant energy rays according to a pattern are incident on the first of said laminae, a record of such pattern will be recorded on said sheet.

4. A radiant energy-to-current transducer-amplifier and recorder as described in claim 3 further including a transparent lamina as a surface element for protecting and supporting all of said laminae, said transparent lamina being secured to the outer face of said first lamina.

5. An instantaneous camera comprising a light-to-current transducer-amplifier having an input side and an output side for converting light rays to electron rays, the electron rays being proportional in spatial density to the intensity of impinging light rays at every point in an image focused on the input side of said transducer-amplifier; electrosensitive paper in bearing engagement with the output side of said transducer-amplifier; means for retaining said electrosensitive paper in bearing engagement wtih said transducer-amplifier; means for applying a positive potential through said paper retaining means to the face of said electrosensitive paper opposite the face thereof in bearing engagement with the output side of said transducer-amplifier; a light-tight box with its air at room temperature for enclosing and supporting said tranducer-amplifier, said paper, and said paper retaining means; and light focusing means adjustably mounted on said light-tight box for focusing an image on the input side of said transducer-amplifier.

6. An instantaneous camera comprising a light-tight box; an adjustable focusing lens secured to said light-tight box; a light-to-current transducer-amplifier cell mounted in said light-tight box, said focusing lens adapted to focus images on the light side of said cell; electrosensitive recording paper; conducting means for pressing said paper against the current side of said cell with uniformly distributed contact pressure; a source of graduated direct-current potentials connected to said transducer-amplifier cell and to said means for pressing said paper against the current side of said cell, and a timer-switch in circuit with said last-mentioned means for controlling the exposure of said paper.

7. A radiant energy-to-current transducer-amplifier and recorder as defined in claim 3 further including current integrating timing means connected between said conductive member and said means for automatically controlling exposure of the electrosensitive paper.

8. An instantaneous image recorder combination adapted for use in a still camera, a motion picture camera, a facsimile recorder, a graphic recorder, a copying camera, an enlarger, and the like, said instantaneous image recorder comprising; a light-tight housing containing a light-to-current transducer-amplifier cell formed of a stack of laminae in close face to face arrangement, beginning at one end of the stack with a light transparent plate, then a lamina with a photosensitive, electron-emissive material, then alternately an electrical conducting plate and a secondary emissive lamina for a plurality of each and ending with a conducting plate, means in a wall of said housing for focusing an image on said light transparent plate, means for mounting an electrosensitive sheet to extend along the exposed face of said end plate, a conducting pressure means disposed to press said sheet against said end conducting plate, means for supplying to each of said conducting plates and to said pressure means, voltage potentials progressively increasing in amounts from plate to plate in the stack and beginning with the lowest potential at the plate nearest the transparent plate and ending with the highest potential at said conducting pressure means, a focus coil coaxial with and surrounding the stack of laminae to limit spreading of electron rays in said stack, means for passing a direct current through said coil, and switch means for controlling said potential supplying means and operable to cause a supply of such potential when an image is to be recorded on said sheet.

9. The combination set forth in claim 8, wherein said switch means includes a manually operated switch, and a timer in series with the switch for inactivating said potential supplying means a selected time after said manual switch is closed.

10. An instantaneous image recorder combination adapted for use in a still camera, a motion picture camera, a facsimile recorder, a graphic recorder, a copying camera, an enlarger, and the like, said instantaneous image recorder comprising; a light-tight housing containing a light-to-current transducer-amplifier cell having at one exposed face a lamina carrying photosensitive electron-emissive material, and having as its other exposed face an electrical conducting plate, optical means in a wall of said housing and in front of said one exposed face for focussing an image on said one exposed face of said cell, means for mounting an electrosensitive sheet against the exposed face of said conducting plate, electrical conducting means pressing said sheet against said conducting plate uniformly over the face area of said sheet, means for supplying voltage potentials to said pressing means and to intermediate parts of said cell, and switch means controlling the supply of potentials by said supplying means and operable to cause such supply of potentials when an image focused on said cell is to be recorded.

11. The combination set forth in claim 10 wherein said switch means includes a manually operated switch and an automatic timer switch in series with each other and with said supplying means, said timer switch being operable to inactivate said supplying means a selected period of time after said manually operated switch is closed to initiate the recording of any image then focused on said cell.

12. An instantaneous image recorder combination adapted for use in a still camera, a motion picture camera, a facsimile recorder, a graphic recorder, a copying camera, an enlarger, and the like, said instantaneous image recorder comprising; a light-tight housing containing a light-to-current transducer-amplifier cell having at one exposed face a lamina carrying photosensitive electron-emissive material, at its other exposed face as a final lamina an electrical conducting plate, and between said laminae, intermediate laminae of alternating conducting plates and electron-emissive plates which propel and amplify electrons emitted by said first-mentioned laminae to said plate, with all of said laminae abutting face to face in a stack, optical means in a wall of said housing and operable to focus an image on said exposed face of the cell, electrical conducting means for pressing an electro-sensitive sheet against the exposed face of said conducting plate, means for supplying voltage potentials to said conducting plate, said pressing means and conducting intermediate laminae, a viewing window in a wall of said housing having a movable closure therefor, reflecting means in said housing between said window and said one exposed face of said cell and making visible through said window any image projected by said optical means on said one exposed face of said cell, and means for supplying voltage potentials to the conducting plates of said cell and to said pressing means when an image projected on said one exposed face is to be recorded on said sheet.

13. The combination as set forth in claim 12 wherein said voltage potentials to said conducting plates of said cell and to said pressing means increase progressively beginning with the plate of the cell nearest the projected image and ending with the highest potential on said pressing means.

14. The combination as set forth in claim 12 and means activated by a closing of said window for rendering effective said voltage supplying means and thus causing a recording on said sheet of any image that is projected upon said cell by said optical means at the time said window is closed.

15. The combination as set forth in claim 12 and means activated by a closing of said window for rendering effective said voltage supplying means and thus causing a recording on said sheet of any image that is projected upon said cell by said optical means at the time said window is closed, said means activated by a closing of said window including timing means which incapacitates said voltage supplying means a selected period of time after it is made effective by a closing of said window.

16. An instantaneous image recorder combination adapted for use in a still camera, a motion picture camera, a facsimile recorder, a graphic recorder, a copying camera, an enlarger, and the like, said instantaneous image recorder comprising; a light-tight housing containing a light-to-current transducer-amplifier cell formed of laminae abutting face to face to form a stack, which has intermediate of its end faces in the stack a plurality of conducting laminae alternating between electron-emissive laminae, with a photo-sensitive electron-emissive material on the first lamina and a conducting plate forming the last lamina, means for projecting an image to be recorded on said first lamina, conducting means for pressing an electrosensitive sheet, on which it is desired to record said image, face to face against the exposed face of said conducting plate, a source of direct current potential, a potentiometer having an adjustable tap for controlling image density connected in series with said source of potential, a voltage divider, having a plurality of taps along it, connected to said adjustable tap of said potentiometer, said taps of said voltage divider being connected in sequence to the conducting laminae and said pressing means and supplying progressively increasing potentials thereto, beginning with the lowest potential at the lamina immediately beyond the lamina with the photosensitive material and ending with the highest voltage at said pressing means, and means for completing an electrical circuit from said source of potential through said potentiometer and said voltage divider and including switch means in said circuit for normally interrupting it but operable to close it long enough to record said projected image on said sheet.

17. The combination as set forth in claim 16 wherein said switch means includes a manually controlled switch and an automatic timer switch, with said manually controlled switch initially closing said circuit and said timer switch opening said circuit a selected interval of time after it is closed.

18. An instantaneous image recorder combination adapted for use in a still camera, a motion picture camera, a facsimile recorder, a graphic recorder, a copying camera, an enlarger, and the like; said instantaneous image recorder comprising a light-to-current transducer-amplifier cell having a first lamina of photosensitive electron-emissive material, a final lamina of conducting material, and intermediate laminae arranged in pairs, each pair having a conducting plate and then a secondary emissive lamina, for amplifying and propelling electrons from said first lamina, with all of said laminae abutting face to face, electrical conducting means for pressing an electro-sensitive sheet against said final lamina, means for supplying direct current voltage potentials to said conducting plates, to said final lamina and to said conducting means, means for applying an image to be recorded upon said first lamina, and means selectively operable for activating said voltage supplying means for an interval sufficient to cause a recording of said image on said sheet.

19. The combination as set forth in claim 18 and means for varying the contrast in the image recorded on said sheet.

20. The combination as set forth in claim 18 wherein said sheet pressing means includes resilient wire filaments closely arranged on one face of a conducting member and bearing against any sheet in recording position in front of it to provide a uniformly distributed contact pressure on said sheet.

21. A method of radiation-to-current transducing, amplifying, and recording comprising the steps of focusing on a planar surface of predetermined dimensions a two-dimensional radiation pattern of more intense and less intense areas, transducing the two-dimensional radiation pattern of more intense and less intense areas into a corresponding array of proportionate parallel electron rays, amplifying uniformly the proportionate parallel electron rays while keeping geometrical relationships constant, discharging the amplified electron rays from a flat surface in a direction perpendicularly thereto, creating a positive potential in an area aligned face to face with and close to, but spaced slightly from, and approximately coextensive in area with said flat surface, and interposing an electrosensitive sheet between said surface and said area in direct contact with said surface, whereby the amplified electrons discharged from said surface will penetrate and modify said electrosensitive sheet in accordance with the disposition and intensity of the amplified incident rays of said pattern.

22. A method of making a record upon an electrosensitive sheet of a selected picture, which comprises forming an image of said picture upon a planar surface in a two-dimensional light pattern of light and dark areas, transducing the light rays of said pattern into a stream of directly proportionate, parallel electrons, amplifying uniformly the proportionate parallel electrons while keeping constant the geometrical relationship of the electrons, disposing an electrosensitive recording sheet transversely across said stream of electrons, creating a positive electrical field at and close to the face of said sheet opposite from that against which said electron stream impinges, terminating the stream of electrons to terminate said recording, and adjusting the intensity of said electrical field to adjust the contrast of the recording.

23. A method of making a record upon an electrosensitive sheet of a selected picture, which comprises forming an image of said picture upon a planar surface in a two-dimensional light pattern of light and dark areas, transducing the light rays of said pattern into a stream of directly proportionate, parallel electrons, amplifying uniformly the proportionate parallel electrons by placing a stack of conducting plates and electron-emissive plates, arranged alternating with one another and in face to face contact transversely across said stream of electrons, applying positive voltage potentials to said conducting plates of said stack and at increasingly higher potentials progressively in the direction of travel of the electrons, disposing an electrosensitive recording sheet transversely across the stream of electrons leaving said stack, creating an electric field at the rear of and close to said sheet, selectively varying the potential of said electric field to vary the contrast in the image formed on the sheet, and selectively varying the potentials on the plates of said stack.

24. A recording device comprising a stack of plates arranged in aligned, face to face contact, one end plate of the stack carrying photosensitive, electron-emissive material the other plates of said stack being alternating conducting and electron-emissive plates, with a conducting plate abutting said one end plate and the other end plate of the stack being a conducting plate, means for supporting an electrosensitive recording sheet flat against said end conducting plate, conducting means for pressing such a recording sheet against said end conducting plate uniformly across the face of the sheet, and means for providing said conducting plates and said pressing means with positive voltage potentials whereby when an image is formed by light rays on said one end plate, it may be recorded on said sheet, and means for controlling said means for providing said voltage potentials on said plates and conducting means whereby the period of desired exposure of said sheet may be controlled selectively.

25. Apparatus for producing a record of an optical image, which comprises a transparent supporting element, means for forming an image to be recorded on an interior face of said element, a photoemissive layer abutting flat against said face of said element and activated by said image to emit electrons proportional in intensity across its face area to the light densities of said image, means for continuously amplifying the emitted electrons and delivering them in a selected direction, an electricity conducting sheet disposed transversely across the path of said delivered electrons, means for mounting an electrosensitive record sheet face to face against said conducting sheet, electrically conducting means removably confining said electrosensitive sheet firmly against said conducting sheet, means for creating selected positive voltages upon said conducting sheet and said confining means, with the voltage on said confining means higher than that on said conducting sheet, and selectively operable means for concurrently activating said amplifying means and applying said selected voltages when a record is to be made on said sheet of the image formed on said element.

26. The apparatus as set forth in claim 25 wherein said sheet mounting means is means for moving a relatively long electrosensitive sheet progressively through its position between said electrically conductive sheet and said electrically conducting confining means where records of said images are made thereon in succession, and means disposed along the path of the electronsensitive sheet after the latter leaves its said position where images are recorded thereon, for projecting pictures of said recorded images in the same succession as they were recorded.

References Cited in the file of this patent

UNITED STATES PATENTS

| 2,409,454 | Thomas | Oct. 15, 1946 |
| 2,501,791 | Silverman | Mar. 28, 1950 |
| 2,549,546 | Thomas | Apr. 17, 1951 |
| 2,594,740 | De Forest et al. | Apr. 29, 1952 |
| 2,692,178 | Grandadam | Oct. 19, 1954 |
| 2,692,948 | Lion | Oct. 26, 1954 |